United States Patent [19]

Glasgow et al.

[11] Patent Number: 4,733,852

[45] Date of Patent: Mar. 29, 1988

[54] GAS-LIQUID SEPARATOR

[75] Inventors: Lyle E. Glasgow, Westlake Village; Robert M. Hansen, Simi Valley, both of Calif.

[73] Assignee: Rockwell International Corporation, El Segundo, Calif.

[21] Appl. No.: 56,828

[22] Filed: Jun. 2, 1987

[51] Int. Cl.$^4$ ............ C21B 3/04; C21B 7/14; C21C 7/00
[52] U.S. Cl. .................. 266/227; 266/217; 220/85 S; 137/206
[58] Field of Search ............ 266/217, 227; 55/159; 220/85 S; 137/206

[56] References Cited

U.S. PATENT DOCUMENTS

| | | | |
|---|---|---|---|
| 3,492,793 | 2/1970 | Bhuta et al. | 55/159 |
| 3,933,448 | 1/1976 | Di Peri | 55/159 |
| 4,039,305 | 8/1977 | Livesay | 55/159 |
| 4,168,718 | 9/1979 | Hess et al. | 137/590 |
| 4,330,306 | 5/1982 | Salant | 55/159 |
| 4,553,565 | 11/1985 | Kerebel | 137/590 |

OTHER PUBLICATIONS

"Capillary Systems for Storable Propellants", Martin Marietta Corporation, Balzer et al., pp. 1-34, 6/67.
"Liquid Outflow Tests of Surface Tension Systems Under Minus One-g", Martin Marietta Corp., Barksdale et al., pp. 1-49, 12/66.
"Final Design Report: Development of a Capillary System for Liquid Propellant Orientation during Low-G", Martin Marietta Corp., Balzer, et al. pp. 1-49, 12/65.

*Primary Examiner*—L. Dewayne Rutledge
*Assistant Examiner*—David W. Schumaker
*Attorney, Agent, or Firm*—H. Fredrick Hamann; Harry B. Field; Clark E. DeLarvin

[57] ABSTRACT

An apparatus for separating a gas from a liquid but truly suited for use in a zero gravity environment. The apparatus includes first and second closed vessels each of which are separated into a gas and liquid zone. The first vessel is separated by gas de-entrainment means and the second vessel by a plurality of elongated passageways for capillary containment of a body of liquid. The passageways provide the sole source of fluid communication between the gas and liquid zones. The gas zones of the first and second vessels are in fluid communication with one another as are the liquid zones of the first and second vessels. Means are provided for introducing a liquid containing entrained gas into the first vessel for impingement upon the gas of the entrainment means such that the liquid passes through the de-entrainment means and flows into the second vessel and the entrained gas is separated and flows into a gas storage space of the second vessel displacing the body of liquid metal contained in the passageways in said second vessel. The apparatus further includes means for withdrawing liquid from a liquid zone of the second vessel which has been freed of any entrained gas. The apparatus is particularly suitable for use in the separation of tritium and helium from the lithium coolant of a nuclear reactor.

10 Claims, 1 Drawing Figure

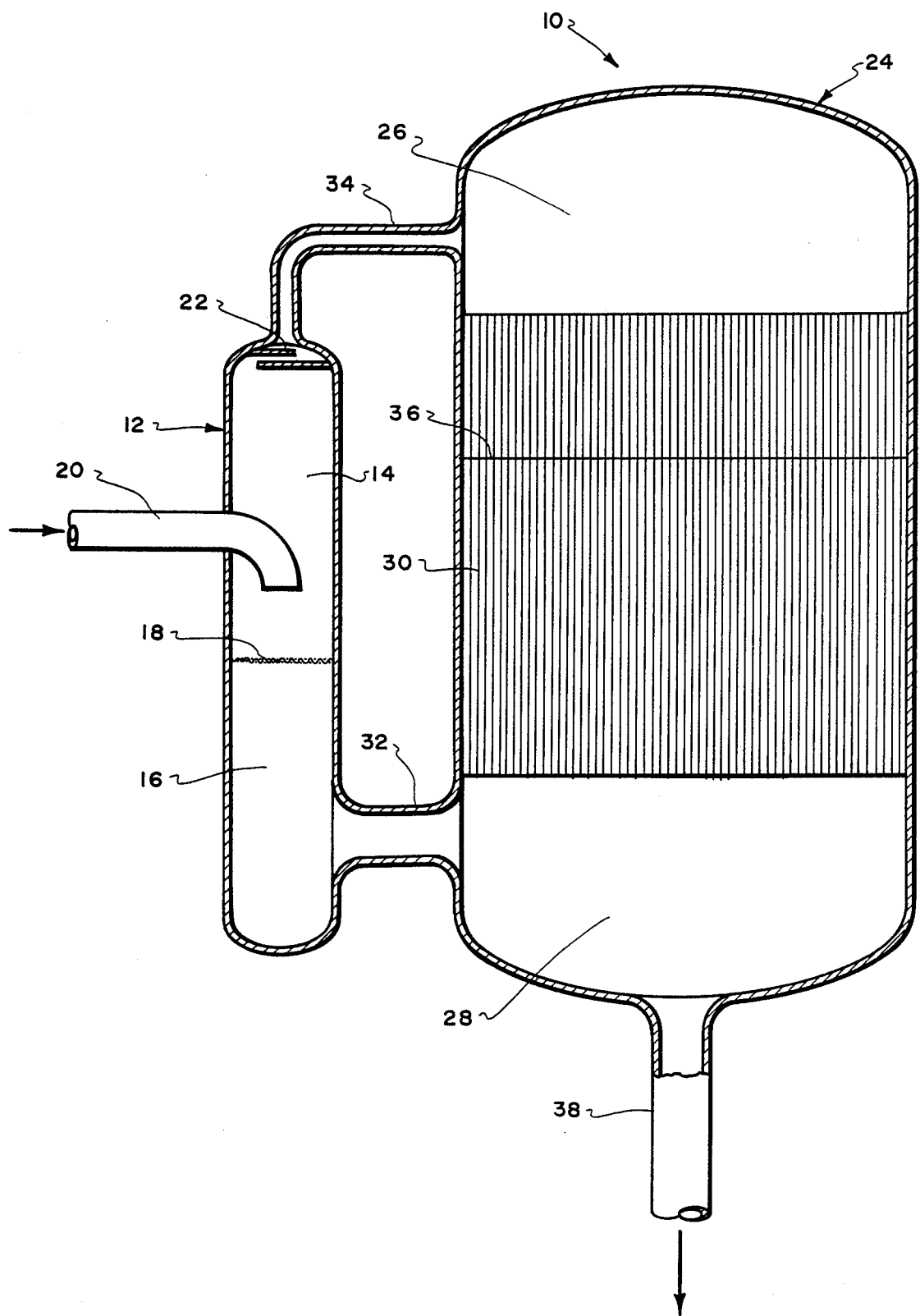

GAS-LIQUID SEPARATOR

BACKGROUND OF THE INVENTION

The present invention broadly relates to the separation of a gas from a liquid. It particularly relates to an apparatus for the separation of a noncondensable gas from liquid metal in a zero gravity environment.

There is currently a major, combined effort being made by certain government agencies to develop a high-power, light-weight nuclear reactor power source (SP-100 Reactor) for use on future spacecraft. The program will require the resolution of numerous technological challenges. One of those challenges will be to provide a means for removing tritium and helium gas from the reactor coolant.

The SP-100 Reactor utilizes liquid lithium as the reactor coolant and heat transport medium. Under neutron irradiation (which occurs inside the reactor core) lithium fissions into tritium and helium atoms which form molecules of gas. The amount of gas generated under such circumstances can be reduced by using lithium which is enhanced in the isotope Li-6; however, even Li-6 fissions at a rate such that approximately one liter of gas would be generated in the coolant per year of operation at 100 KWa (net). This gas must be removed and maintained separate from the coolant. If it were allowed to accumulate it would interfere with the heat transport of the coolant and could result in overheating and failure of individual fuel pins within the reactor core. Furthermore, the reactor must continue to be cooled via circulation of the coolant for several years after ultimate shut-down or failure of the system in order to remove the heat of radioactive decay of fission products. Thus there must be provided some means for maintaining the gas separate from the liquid coolant which would continue to function reliably even after loss of electrical power and loss of control over the gas separation apparatus.

Removing entrained gas bubbles from a liquid metal in a zero gravity environment is not an easy task. In the absence of a gravity gradient, the gas could be anywhere in the system. Nonetheless it is essential that some means be provided for separating the gas from the coolant and accumulating it in a continuous manner. Using moving parts such as a centrifugal pump which could separate liquid from a gas via centripetal acceleration would not be satisfactory due to reliability concerns; namely, mechanical devices can fail.

In addition, once separated there also must be some means for keeping the gas separate from the liquid coolant. Venting the gas into open space would not be acceptable if valves were required since a valve failure (either open or closed) could result in overheating of the reactor core with the attendant loss of the power system. A gas permeable frit could be used to form a portion of the wall in the coolant system. The permeable frit would let the gas diffuse out of the system into space. This would be undesirable, however, because it would represent a structurally weak point in the coolant system. Accordingly, there should be some means of storing the gas in the system which would be capable of maintaining the gas and liquids separate throughout the life of the system.

OBJECTS OF THE INVENTION

It is an object of the invention to provide an apparatus which utilizes the surface tension of a liquid to continuously separate gas bubbles from the liquid.

It is another object of the invention to provide an apparatus which will maintain gas separate in an internal storage device utilizing the surface tension of a liquid.

It is still another object of the invention to provide an apparatus for the separation of gas bubbles from a liquid which requires no moving parts.

It is still another object of the invention to provide such an apparatus which will separate a gas from a liquid and keep them separated in a substantially zero gravity environment.

Another object of the invention is to provide an apparatus for separating a gas from a liquid and maintaining them separate for hundreds of years.

These and other objects of the invention will be more apparent from the drawing and following description thereof.

SUMMARY OF THE INVENTION

The present invention provides an apparatus for effecting separation of a gas from a liquid containing the same. It is a particular advantage of the present invention that it is utilizeable in a substantially zero gravity environment as would be encountered in outer space. It is another advantage of the present invention that it requires no moving parts.

Broadly, the apparatus comprises a first closed vessel separated into a gas and a liquid zone by a gas de-entrainment means. Means are provided for introducing the liquid containing entrained gas into the first vessel for impingement upon the gas de-entrainment means. There also is provided a second closed vessel separated into a gas and liquid zone by an elongated member provided with a plurality of elongated passageways for capillary containment of a body of liquid. The passageways provide the sole means of fluid communication between the gas and the liquid zone. The gas zone of the first and second vessels are in fluid communication with one another and the liquid zone of the first and second vessels also are in fluid communication with one another. The second vessel also includes a means for withdrawing liquid free of gas from the liquid zone for recycle to the system from which it came, for example, a lithium-cooled nuclear reactor.

In operation a liquid for example, lithium, is introduced into the first vessel and impinged upon the de-entrainment means whereby the liquid lithium passes through the de-entrainment means and flow into the second means. The entrained gas is separated and flows into a storage space (gas zone) of the second vessel displacing a portion of the body of liquid contained in the fluid passageways of the second vessel.

BRIEF DESCRIPTION OF THE DRAWING

The sole FIGURE is a schematic of an apparatus for the practice of the present invention.

DESCRIPTION OF THE PREFERRED EMBODIMENT

Referring to the drawing therein is schematically depicted an apparatus 10 constructed in accordance with the present invention. Broadly, the apparatus comprises a first closed vessel 12 separated into a gas zone 14 and a liquid zone 16 by a gas de-entrainment means 18. Typically, the gas de-entrainment means will comprise a screen having a mesh size such that a liquid will pass therethrough but the surface tension of the liquid will be sufficient to prohibit the passage of a gas. In accordance with the particularly preferred embodiment wherein the liquid is lithium the screen will have a mesh size of from about 80×80 to 500×500 standard sieve size.

Vessel 12 is also provided with a liquid inlet 20 for the introduction of a liquid containing an entrained gas. Inlet 20 is arranged such that the liquid and gas introduced into vessel 12 is directed in a manner to impinge rotationally upon the surface of gas de-entrainment means 18. Advantageously, gas zone 14 is also provided with a labyrinth or baffle 22, the function of which will be described later.

Apparatus 10 also includes a second closed vessel 24 which also is divided into a gas zone 26 and a liquid zone 28 by an elongated member 30 having a plurality of fluid passageways extending therethrough. The passageways provide the sole means for fluid communication between gas zone 26 and liquid zone 28. The passageways provide for the capillary containment of a body of liquid metal which forms a liquid gas interface 36. A lower portion of vessel 24 is provided with a discharge duct 38 from which the liquid, now free of entrained gas, is returned to the system from which it was originally withdrawn.

The operation of the invention will be described with reference to its particularly preferred embodiment; namely, operation in a zero gravity environment for the separation of helium and tritium from the lithium coolant of a nuclear reactor. In operation a bleed stream of the lithium coolant is withdrawn for introduction into apparatus 10 via inlet 20. It will be appreciated that all of the primary coolant flow could pass through apparatus 10. In the interest of economics, only a portion would typically be withdrawn since that would be sufficient to maintain the entrained gas concentration at an acceptable value. The lithium containing entrained helium and tritium is impinged upon the gas de-entrainment means 18 which typically will be a screen having a mesh size of from about 30×30 to 500×500 standard sieve size. The surface tension of the liquid lithium is sufficient to prevent the gas molecules of helium and tritium from passing through thus they move upwardly through gas zone 14 and labyrinth 22, the latter of which is provided to remove any entrained droplets of lithium. The gas then passes through a conduit 34 into the gas space 26 of second vessel 24 displacing liquid lithium contained in member 30.

Over a period of time the lithium gas interface 36 will move continually displacing additional liquid, however, the volume of member 34 can be selected to accommodate the required amount of gas for the life of the reactor. The lithium passing through gas de-entrainment means 18, now substantially free of any entrained gas, passes through a conduit 32 to liquid zone 28 of second vessel 24. From liquid zone 28 the liquid is withdrawn via discharge outlet 38 for return to the system.

Typically, the passageways in member 30 will be formed from a plurality of small diameter tubes, the precise size of the tubes will vary depending upon the physical characteristics of the liquid being processed, however, the selection is well within the skill of those versed in the art. Typically, for the preferred application with lithium, the tubes will have an outside diameter within the range of from about 0.55 to 10.5 mm and an internal diameter within the range of from about 0.5 to 10 mm. In some instances it will be advantageous to cover the bottom ends of the tubes with a wire mesh or screen of the type previously described. The use of the screen will permit maintaining the interface under higher acceleration forces than would otherwise be possible.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. An apparatus for separating a gas from a liquid metal containing the same in a zero gravity environment comprising:
   a first closed vessel separated into a gas and liquid zone by a gas de-entrainment means;
   means for introducing liquid metal containing entrained gas into said first vessel for impingement upon said gas de-entrainment means;
   a second closed vessel separated into a gas and liquid zone by a plurality of elongated tubes for capillary containment of a body of liquid metal;
   the gas zone of the first and second vessels being in fluid communication with one another and the liquid zone of said first and second vessels being in fluid communication with one another; and
   means for withdrawing liquid metal from the liquid zone of said second vessel, whereby when liquid metal containing entrained gas is impinged upon said gas de-entrainment means said liquid metal passes through the de-entrainment means and flows into said second vessel and the entrained gas is separated and flows into the gas storage space of said second vessel displacing the body of liquid metal contained in the plurality of tubes in said second vessel.

2. The apparatus of claim 1 wherein said means for injecting said liquid containing entrained gas includes a liquid lithium source.

3. The apparatus of claim 1 wherein said means for injecting said liquid containing entrained gas includes a source of mixed tritium and helium.

4. The apparatus of claim 1 wherein there is further provided a baffle means located in an upper portion of the gas zone of said first vessel.

5. The apparatus of claim 1 wherein said means for introducing said liquid further provides for its introduction at a location intermediate said baffle means and said gas de-entrainment means.

6. The apparatus of claim 1 wherein said de-entrainment means comprises a screen having openings sufficiently small that the surface tension of the liquid prohibits the flow of gas therethrough but sufficiently large to permit the passage therethrough of liquid.

7. The apparatus of claim 1 wherein said tubes have openings having an inside diameter within the range of from 10 millimeters to 0.5 millimeters.

8. An apparatus for separating helium and tritium from a liquid lithium containing the same in a zero gravity environment comprising:
   a first closed vessel separated into a gas and liquid zone by a wire screen;
   a baffle means located in an upper portion of said first closed vessel;

means for introducing liquid lithium containing entrained helium and tritium into said first vessel intermediate said baffle means and said wire screen for impingement upon said wire screen;

a second closed vessel separated into a gas and a liquid zone by a plurality of elongated tubes for capillary containment of a body of liquid lithium;

the gas zone of the first and second vessels being in fluid communication with one another and the liquid zone of said first and second vessels being in fluid communication with one another; and means for withdrawing liquid lithium from the liquid zone of said second vessel, whereby when liquid lithium containing entrained helium and tritium is impinged upon said wire screen said liquid lithium passes through the wire screen and flows into said second vessel and the entrained helium and tritium is separated and flows into the gas storage space of said second vessel displacing the body of liquid lithium contained in the plurality of tubes in said second vessel.

9. The apparatus of claim 8 wherein said de-entrainment means comprises a screen having openings sufficiently small that the surface tension of the liquid prohibits the flow of gas therethrough but sufficiently large to permit the passage therethrough of liquid.

10. The apparatus of claim 9 wherein said tubes have openings having an inside diameter within the range of from 10 millimeters to 0.5 millimeters.

* * * * *